March 7, 1972   F. P. KOBER ET AL   3,647,550
DISPOSABLE ELECTROCHEMICAL CELLS AND METHOD OF OPERATING SAME
Filed Jan. 28, 1970
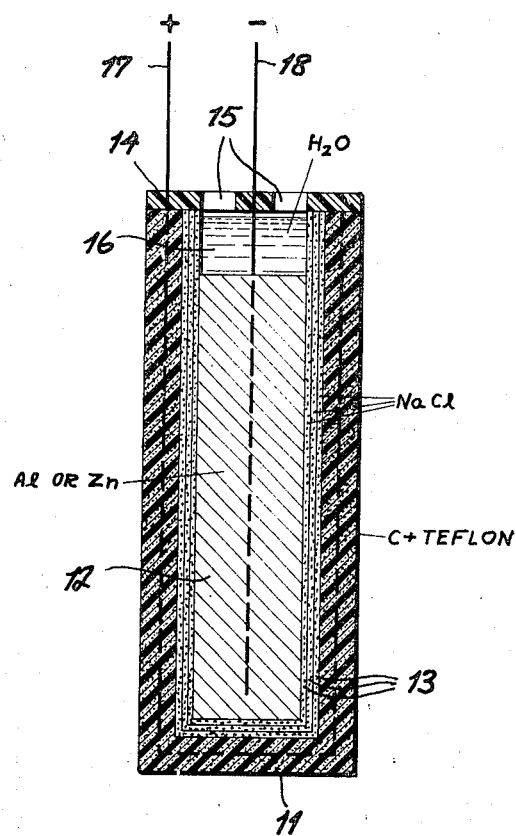
Frederick P. Kober
Hiry B. West
INVENTORS.
BY
Karl G. Ross
Attorney 3,647,550
DISPOSABLE ELECTROCHEMICAL CELLS AND METHOD OF OPERATING SAME
Frederick P. Kober, Bayside, and Hiry B. West, New York, N.Y., assignors to Yardney International Corp., New York, N.Y.
Continuation-in-part of application Ser. No. 854,736, Sept. 2, 1969. This application Jan. 28, 1970, Ser. No. 6,461
Int. Cl. H01m 29/02, 29/04
U.S. Cl. 136—86 A  3 Claims

ABSTRACT OF THE DISCLOSURE

An electrochemical cell with an air-depolarizable cathode, a consumable anode of a base metal (e.g. zinc or aluminum) and an interelectrode separator laden with the anhydride of an aqueous electrolyte, such as sodium chloride, is activated by the introduction of a volume of water sufficient for only a fractional discharge of the stored electric energy. Upon prolonged idleness after activation, the depletion of the residual water supply by chemical action and evaporation halts the interaction between the stored electrolyte and the anode material, thereby conserving the remaining energy and inhibiting corrosion.

---

This application is a continuation-in-part of our pending application Ser. No. 854,736, filed Sept. 2, 1969.

Our present invention relates to a disposable (i.e. nonrechargeable) electrochemical cell or a primary battery incorporating several such cells, as well as to a method of operating same.

Cells and batteries of the so-called hybrid type are known wherein one electrode or group of electrodes (generally the positive electrodes or cathodes) is of the gas-depolarizable type while the electrode or electrodes of opposite polarity (generally the negative electrodes or anodes) are dischargeable by electrochemical reaction with a liquid electrolyte. In a typical cell of this type, an air-depolarizable cathode co-operates with an oxidizable anode, e.g. of zinc or aluminum, in an alkaline or saline electrolyte.

The general object of our present invention is to provide a method of so operating a disposable cell or battery of the hybrid type just described that, within the limits of its original storage capacity, the same can be repeatedly activated and deactivated for a series of partial discharges and, upon deactivation, is practically free from internal corrosion and wasteful energy dissipation so as to have a virtually unlimited shelf life.

The operating period of a cell or battery of this description, upon each such activation, can be conveniently selected at a fraction of the total discharge period so that the electrochemical processes will automatically terminate before complete discharge, subject to resumption upon subsequent reactivation; such a source of electrical energy is particularly suitable, for example, as a power supply for mechanical toys which, frequently, are used for only a few minutes at a time.

A further object of our invention is to provide a method of operation as stated above which can be practiced on a power source of this character whose constituents are nontoxic so as not to constitute a health hazard for the users, especially children.

To realize these objects we provide, pursuant to our present invention, an electrochemical cell with at least one air-depolarizable cathode and at least one consumable anode in juxtaposed or nested relationship, with interposition of a permeable separator of sheet material containing in its interstices a water-soluble salt reacting electrolytically with the anode upon the addition of water; the fluid space between the electrodes, receiving the separator, is upwardly open for the introduction of water and has a free volume accommodating a quantity of water less than that required to dissolve all the salt initially stored in the separator.

Thus, even upon a complete filling of the available fluid space with water, the cell will cease generating current after exhaustion of only a fraction of the electrochemical energy originally stored therein; during its operation, the water is partly consumed by the electrochemical reaction and partly evaporated until the internal circuit between the electrodes is broken. Though some liquid may remain at this stage within the separator in the vicinity of each electrode, the interruption of the ionic path between these electrodes will prevent any significant attack of this residual liquid upon the consumable anode or anodes until the cell has fully dried up. At any time after such deactivation, the cell can be reactivated by the introduction of a further quantity of water.

From the viewpoint of availability, ready solubility in water, and freedom from toxicity, the use of sodium chloride (table salt) as the electrolytic anhydride is most advantageous.

Although, in principle, the upwardly open fluid space could be the interior of a housing surrounding the entire electrode assembly while leaving the cathode or cathodes accessible to a supply of oxygen or air, a preferred construction utilizes a container-shaped, either tubular or prismatic, cathode as an electrode casing, this cathode forming a pocket for the anode or anodes and the separator enveloping same. The outer cathode surface is thus directly exposed to the ambient air to draw from it the oxygen required for depolarization; as the exposed cathode surface is large compared with the effective anode surface, no forced circulation of air or oxygen will usually be required for the low-energy uses primarily contemplated in conjunction with the present invention.

The sole figure of the accompanying drawing shows, by way of example, a longitudinal cross-section through a one-cell electrochemical energy generator embodying our invention.

In the drawing, a cathode 11 forms an upwardly open pocket for an anode 12 enveloped by several layers of permeable separator material, such as absorbent paper, cotton felt or webs of synthetic filaments, whose interstices are loaded with a quantity of sodium chloride sufficient to react with the entire anode material. Cathode 11 may consist, in the conventional manner, of a catalytically active material, such as carbon particles with or without a coating of noble metal (e.g. platinum), in a matrix of hydrophobic resin (e.g. Teflon) forming a porous structure impermeable to a liquid electrolyte; this cathode is overlain by a lid 14 of similar active or wholly inert material bonded thereto or removably clamped to it. Lid 14 has several holes or slots 15 for the introduction of water 16 which penetrates the separator 13 and dissolves part of the salt stored therein. The total quantity of water receivable within the pores of the separator and the free space above anode 12 is insufficient to dissolve all of the salt present and may be so chosen, for example, that not more than half the original anode material is reacted (i.e. chlorinated) in the electrolyte if no additional water is supplied during discharge.

Terminal leads 17 and 18 project from electrodes 11 and 12, respectively, and may be integral with metallic grids imbedded in these electrodes as is well known per se. The following reactions are postulated:

A (with aluminum anode):
- Anode reaction: $4Al \rightarrow 4Al^{+++} + 12e^-$
- Cathode reaction: $3O_2 \text{ (air)} + 6H_2O + 12e^- \rightarrow 12OH^-$
- Reaction with electrolyte: $4Al^{+++} + 12NaCl \rightarrow 4AlCl_3 + 12Na^+$
- Overall cell reaction: $4Al + 3O_2 + 6H_2O + 12NaCl \rightarrow 4AlCl_3 + 12Na^+ + 12OH^-$ B (with zinc anode):
- Anode reaction: $2Zn \rightarrow 2Zn^{++} + 4e^-$
- Cathode reaction: $O_2 \text{(air)} + 2H_2O + 4e^- \rightarrow 4OH^-$
- Reaction with electrolyte: $2Zn^{++} + 4NaCl \rightarrow 2ZnCl_2 + 4Na^+$
- Overall cell reaction: $2Zn + O_2 + 2H_2O + 4NaCl \rightarrow 2ZnCl_2 + 4OH^-$ It may further be assumed that an electrolyte consisting of a 25% aqueous solution of NaCl reacts in a volumetric ratio of 3:1 with aluminum ions ($Al^{+++}$) and in a volumetric ratio of 2:1 with zinc ions ($Zn^{++}$). With these data it is easy to dimension the separator 13 and the anode 12 in such a way that the amount of salt lodged in the pores of the separator exceeds the stoichiometric equivalent of the active anode material, and to restrict the free fluid space above the anode so that the total quantity of water received therein will be less than that needed to oxidize the entire anode material in accordance with the foregoing equations.

Besides pure zinc or aluminum, alloys of these metals could also be used. A suitable alloy of aluminum and tin has been described, for example, in U.S. Pat. No. 3,189,486.

We claim:

1. A method of operating an electrochemical cell including an air-depolarizable cathode and a juxtaposed consumable anode defining an upwardly open fluid space, with a permeable separator interposed therebetween, comprising the step of loading said separator with a water-soluble salt capable of reacting electrolytically with said anode, adding water to the cell within said fluid space in a quantity less than that required to dissolve all of said salt, drawing current from said anode and cathode in the presence of said water, letting the ionic path between said anode and cathode be interrupted by partial evaporation of said water after partly discharging the cell, and thereafter allowing the remaining water to evaporate from said fluid space before introducing additional water for a further discharge.

2. A method as defined in claim 1 wherein said salt is sodium chloride.

3. A method as defined in claim 1 wherein said cathode is exposed to ambient air during discharge.

References Cited

UNITED STATES PATENTS

| | | | |
|---|---|---|---|
| 2,050,174 | 8/1936 | Gordon | 136—100 |
| 3,257,240 | 6/1966 | Fasola | 136—100 |
| 3,471,330 | 10/1969 | Berger et al. | 136—6 |

WINSTON A. DOUGLAS, Primary Examiner

H. A. FEELEY, Assistant Examiner